(12) United States Patent
Matosevich et al.

(10) Patent No.: US 11,573,736 B2
(45) Date of Patent: Feb. 7, 2023

(54) MANAGING HOST CONNECTIVITY TO A DATA STORAGE SYSTEM

(71) Applicant: EMC IP Holding Company LLC, Hopkinton, MA (US)

(72) Inventors: Rivka Matosevich, Zichron Ya'acov (IL); Doron Tal, Haifa (IL); Yakov Gerlovin, Netanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 17/106,988

(22) Filed: Nov. 30, 2020

(65) Prior Publication Data

US 2022/0171567 A1     Jun. 2, 2022

(51) Int. Cl.
    *G06F 3/06*     (2006.01)

(52) U.S. Cl.
    CPC .......... *G06F 3/0659* (2013.01); *G06F 3/0604* (2013.01); *G06F 3/067* (2013.01); *G06F 3/0611* (2013.01); *G06F 3/0629* (2013.01); *G06F 3/0653* (2013.01)

(58) Field of Classification Search
None
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |

(Continued)

FOREIGN PATENT DOCUMENTS

| | | |
|---|---|---|
| WO | 2015034500 A1 | 3/2015 |
| WO | PCT/US2019/024885 | 1/2020 |

(Continued)

OTHER PUBLICATIONS

Chrysos, Nikolaos, et al. "High performance multipath routing for datacenters." 2014 IEEE 15th International Conference on High Performance Switching and Routing (HPSR). IEEE, 2014. (Year: 2014).*

(Continued)

*Primary Examiner* — Nicholas J Simonetti
(74) *Attorney, Agent, or Firm* — Ryan, Mason & Lewis, LLP

(57) ABSTRACT

Techniques are provided for managing host connectivity to a data storage system. A host connectivity management system receives a request from a host system to connect to a data storage system. The data storage system includes storage nodes which include storage volumes, and each storage node includes multiple ports to enable connection to the storage node. The host connectivity management system determines a subset of ports, among all available ports of the storage nodes, to assign to the host system for use by the host system for connecting to the storage nodes of the data storage system to access the storage volumes. The host connectivity management system sends connection information to the host system to enable the host system to connect to the data storage system, wherein the connection information includes port identifiers associated with the subset of ports assigned to the host system.

20 Claims, 7 Drawing Sheets

(56) References Cited

U.S. PATENT DOCUMENTS

| | | | |
|---|---|---|---|
| 6,052,799 | A | 4/2000 | Li et al. |
| 6,438,595 | B1* | 8/2002 | Blumenau ......... H04L 29/12009 709/229 |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,229,021 | B1* | 3/2019 | Iwamitsu ............... G06F 3/0689 |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2018/0046686 | A1* | 2/2018 | Kobayashi ............ G06F 3/0605 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2019/0238446 | A1 | 8/2019 | Barzik et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

Awais, Muhammad, and Munam Ali Shah. "Information-centric networking: a review on futuristic networks." 2017 23rd International Conference on Automation and Computing (ICAC). IEEE, 2017. (Year: 2017).*

Dell EMC, "Dell EMC VxRack FLEX," Dell EMC Product Overview, 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage vol. Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using Volume Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage Volume Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of Volume Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

Dell Technologies, "Dell EMC Powerscale OneFS: A Technical Overview," White Paper, Oct. 2020, 42 pages.

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

(56) References Cited

OTHER PUBLICATIONS

U.S. Appl. No. 17/071,407 filed in the name of John Moran et al. on Oct. 15, 2020, and entitled "Dynamic Remediation Actions in Response to Configuration Checks in an Information Processing System."
U.S. Appl. No. 17/077,105 filed in the name of Yosef Shatsky et al. on Oct. 22, 2020, and entitled "Volume Tiering in Storage Systems."

* cited by examiner

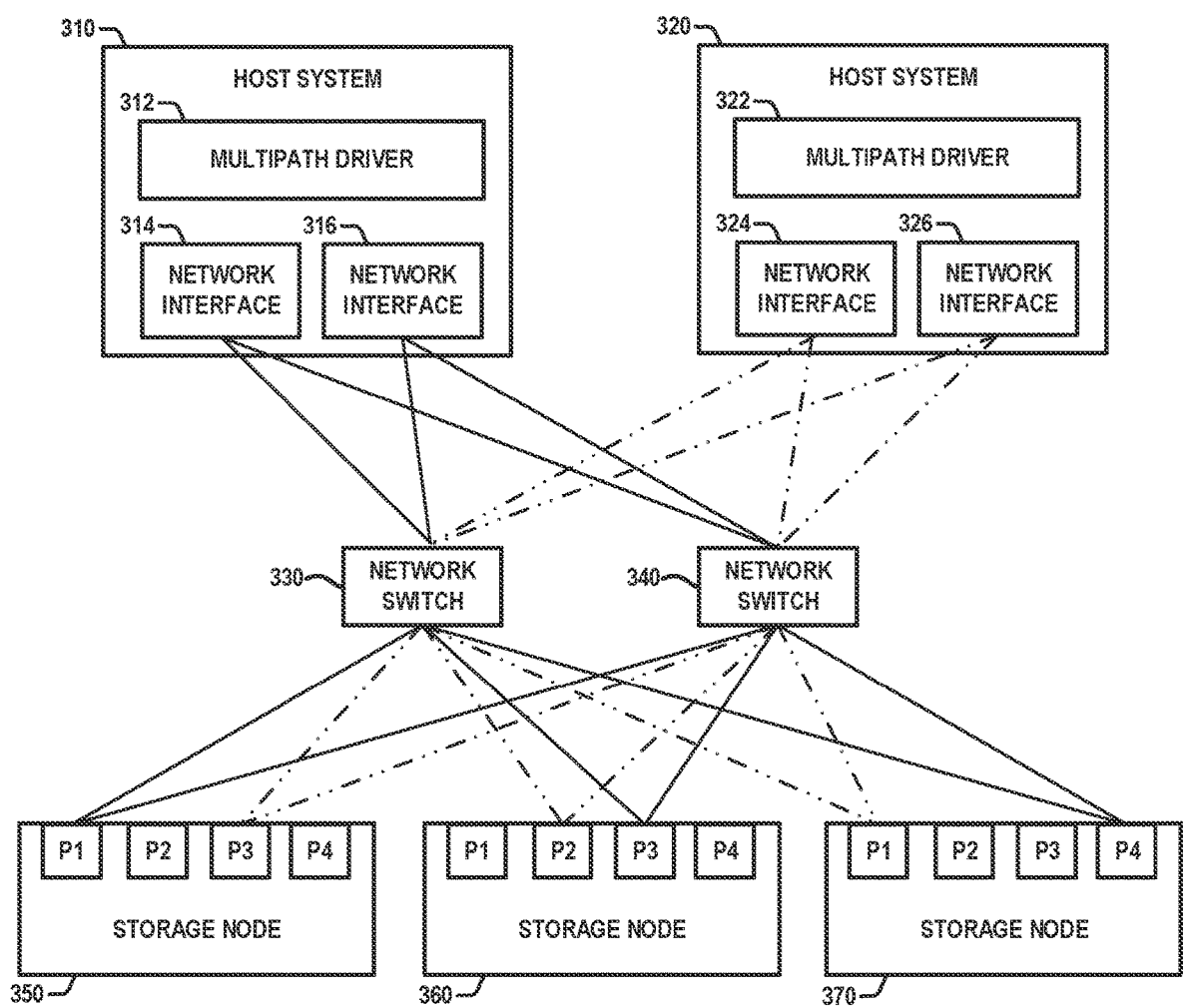

300

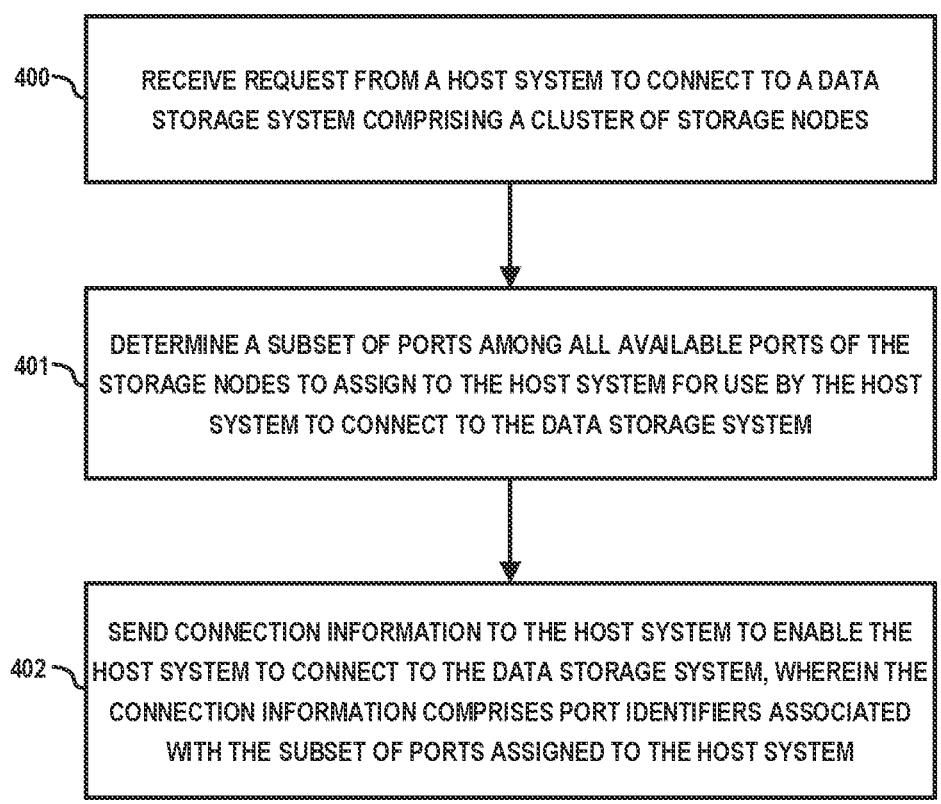

MANAGING HOST CONNECTIVITY TO A DATA STORAGE SYSTEM

TECHNICAL FIELD

This disclosure relates generally to storage systems and, more specifically, to techniques for managing connectivity between hosts and storage nodes in a data storage system.

BACKGROUND

Distributed storage systems are implemented using a plurality of storage devices (e.g., storage arrays). The storage devices can reside locally in a given storage node, or the storage devices can reside on multiple storage nodes that are network connected using, e.g., a local area network or a storage fabric. Application servers utilize network attached storage to achieve flexibility and better utilization of storage capacity, wherein connections from the application server to the storage nodes over a network are implemented using multipath connection techniques to provide resiliency to failure and to achieve sufficient throughput. The multipath connections are managed by a multipath driver which executes on the application server. The multipath driver is responsible for managing multiple connections to volume images that are available through multiple independent paths. As the number of storage nodes within a cluster increases, the number of independent paths that must be managed by the multipath driver increases, which can be problematic for proper operation and configuration of the multipath driver.

SUMMARY

Exemplary embodiments of the disclosure include methods for managing host connectivity to a data storage system. In an exemplary embodiment, a host connectivity management system receives a request from a host system to connect to a data storage system. The data storage system comprises storage nodes which comprise storage volumes, wherein each storage node comprises multiple ports to enable connection to the storage node. The host connectivity management system determines a subset of ports, among all available ports of the storage nodes, to assign to the host system for use by the host system for connecting to the storage nodes of the data storage system to access the storage volumes. The host connectivity management system sends connection information to the host system to enable the host system to connect to the data storage system, wherein the connection information comprises port identifiers associated with the subset of ports assigned to the host system.

Other embodiments of the disclosure include, without limitation, systems and articles of manufacture comprising processor-readable storage media, which are configured for managing host connectivity to a data storage system.

BRIEF DESCRIPTION OF THE DRAWINGS

FIGS. 3A, 3B, and 3C schematically illustrate methods for managing host connectivity to a data storage system, according to an exemplary embodiment of the disclosure.

FIG. 4 is a flow diagram of a method for managing host connectivity to a data storage system, according to an exemplary embodiment of the disclosure.

DETAILED DESCRIPTION

Exemplary embodiments of the disclosure will now be discussed in further detail with regard to systems and methods for managing host connectivity to a data storage system. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
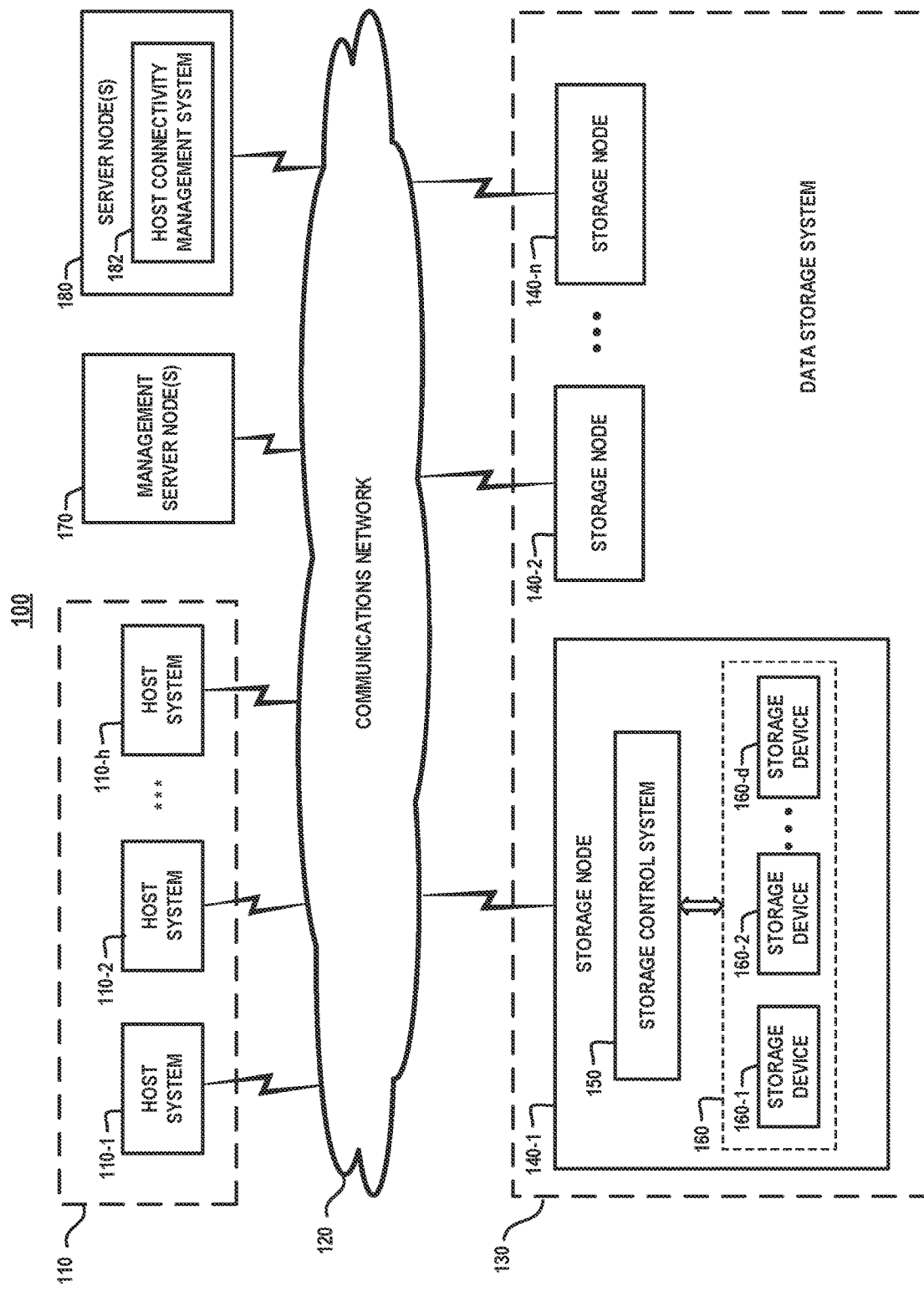
FIG. 1 schematically illustrates an information processing system which comprises a system that is configured to manage host connectivity to a data storage system, according to an exemplary embodiment of the disclosure.

FIG. 1 schematically illustrates an information processing system which comprises a system that is configured to manage host connectivity to the data storage system, according to an exemplary embodiment of the disclosure. In particular, FIG. 1 schematically illustrates an information processing system 100 which comprises one or more host systems 110-1, 110-2, . . . 110-$h$ (collectively, host systems 110), a communications network 120, and a data storage system 130. The data storage system 130 comprises one or more storage nodes 140-1, 140-2, . . . , 140-$n$ (collectively, storage nodes 140). The storage node 140-1 comprises a storage control system 150, and a plurality of storage devices 160-1, 160-2, . . . , 160-$d$ (collectively, storage devices 160). In some embodiments, the other storage nodes 140-2 . . . 140-$n$ have the same or similar configuration as the storage node 140-1 shown in FIG. 1. The system 100 further comprises one or more storage system management server nodes 170 which implement application programming interfaces (APIs) to enable manual, automated, and/or semi-automated configuration, provisioning, and monitoring of the data storage system 130 and associated storage nodes 140. In some embodiments, the management server nodes 170 comprise stand-alone dedicated management server nodes, which may comprise physical and/or virtual servers.

Moreover, the system 100 comprises one or more server nodes 180 which implement a host connectivity management system 182. The host connectivity management system 182 implements methods that are configured to perform various functions for managing and controlling the connectivity of the host systems 110 to the storage nodes 140 of the data storage system 130. For example, when a host system 110 requests access the data storage system 130, the host connectivity management system 182 will receive a request (e.g., discovery request) from the host system 110 to obtain connection information to enable the host system 110 to connect to data storage nodes 140 of the data storage system 130. In response to the connection request, the host connectivity management system 182 will determine a subset of ports, among all available ports of the storage nodes 140, to assign to the host system 110 for use by the host system 110 for connecting to the storage nodes 140 to access storage volumes. The host connectivity management system 182 will send connection information to the host system 110 to enable the host system to connect to the data storage system 130, wherein the connection information comprises port identifiers associated with the subset of ports (of the storage nodes 140) assigned to the host system 110. An exemplary embodiment of the host connectivity management system 182 and associated functionality will be explained in further detail below in conjunction with FIGS. 2, 3A, 3B, 3C, and 4.

In some embodiments, the host connectivity management system 182 comprises a centralized system which executes on the one or more server nodes 180 apart from the one or more management server nodes 170 and the storage nodes 140 of the data storage system 130. In some embodiments, the server nodes 180 comprises stand-alone dedicated server nodes to manage host connectivity, wherein such nodes 180 may comprise physical and/or virtual servers. In some embodiments, the host connectivity management system 182 is implemented on the one or more management server nodes 170. In some embodiments, the host connectivity management system 182 is implemented on one or more of the storage nodes 140 of the data storage system 130.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 140 and (ii) read requests to access data that is stored in one or more of the storage nodes 140.

The communications network 120 is configured to enable the host systems 110 and the management server nodes 170 to communicate with the server nodes 180 and the storage nodes 140 of the data storage system 130, as well as enable communication between the storage nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out data storage system which allows additional storage nodes to be added to the cluster to scale the performance and storage capacity of the data storage system 130. It is to be noted that each storage node 140 and its associated storage devices 160 is an example of what is more generally referred to herein as a "storage system" or a "storage array."

In some embodiments, each storage node 140 comprises a storage server that is implemented on, e.g., a physical server machine or storage appliance comprising hardware processors, system memory, and other hardware resources that execute software and firmware to implement the functionality of the storage node 140 and storage control system 150. In some embodiments, each storage node 140 comprises a plurality of storage control processors which execute a lightweight operating system (e.g., a customized lightweight Linux kernel) and functional software (e.g., software-defined storage software) to implement various functions of the storage node 140 and storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the cluster, etc. The data management and storage functions and services implemented by the storage control systems 150 include, but are not limited to, by aggregating/pooling storage capacity of the storage nodes 140, performing functions such as inline data compression/decompression, deduplication, thin provisioning, and data protection functions such as data replication, snapshots, Reed-Solomon error correction coding, and other data protection schemes based on data striping and parity (e.g., RAID), and other types of data management functions, depending on the system configuration.

In exemplary embodiments where the data storage system 130 comprises a cluster of storage nodes 140, the storage control systems 150 of the storage node cluster will communicate in a cooperative manner to process each data access request received from the host systems 110. The data management and storage functions and services implemented by the storage control system 150 include, but are not limited to, by aggregating/pooling the storage capacity of the storage nodes 140, performing functions such as inline data compression/decompression, deduplication, thin provisioning, and data protection functions such as data replication, snapshot, and data protection schemes based on data striping and parity (e.g., RAID), and other types of data management functions, depending on the system configuration.

Further, the storage devices 160 of a given storage node 140 comprise one or more of various types of storage device such as hard-disk drives (HDDs), solid-state drives (SSDs), Flash memory cards, or other types of non-volatile memory (NVM) devices including, but not limited to, non-volatile random access memory (NVRAM), phase-change RAM (PC-RAM), magnetic RAM (MRAM), etc. In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 160 may be implemented in each storage node 140. In this regard, the term "storage device" as used herein should be broadly construed to encompass all types of persistent storage media including hybrid drives. On a given storage node 140, the storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As noted above, the data storage system 130 can implement any type of dynamic scale-out storage system in which the number of storage nodes within the storage cluster can change over time. In an exemplary embodiment, the data storage system 130 comprises a dynamic scale-out NAS system that is configured to implement a high-capacity file-level storage system architecture (e.g., for storing big data, multimedia objects, and other types of unstructured data). In this configuration, the storage nodes 140 provide a cluster-based storage array, where each storage node 140 comprises a storage server node which executes an integrated custom lightweight operating system that is configured to unify a cluster of the storage nodes 140 into a single shared resource, e.g., create a single file system which is presented to the host systems 110 as a shared filesystem. For example, the operating systems running on the storage nodes 140 operate in a collective matter to generate a global namespace in which multiple file systems are aggregated to present a consolidated view to present files and folders to the host systems 110.

In some embodiments of a dynamic scale-out NAS system, the host systems 110 can run different operating systems (e.g., Windows, Unix/Linux, and Mac operating systems) and communicate with the storage nodes 140 over a TCP/IP LAN or WAN network (e.g., 1 Gigabit Ethernet (GbE), 10 GbE, 40 GbE, etc.) using various file sharing protocols. Such file sharing protocols include, but are not limited to, Network File System (NFS) protocol, Server Message Blocks (SMB) protocol, Common Internet File Sharing (CIFS) protocol, File Transfer Protocol (FTP), Hypertext Transfer Protocol (HTTP), Hadoop Distributed File System (HDFS) protocol, Apple Filing Protocol (AFP), and other types of current or future industry standard file sharing protocols. Moreover, the storage nodes 140 within the NAS cluster communicate with each other using a dedicated backend high-speed network (e.g., Ethernet LAN, Fibre Channel, InfiniBand network, etc.), wherein the dedicated backend network essentially allows the storage nodes 140 to operate as one storage node. This architecture allows each storage node 140 to have full visibility and write/read access to/from a single expandable file system.

In other embodiments of a dynamic scale-out storage system, the data storage system 130 comprises a dynamic scale-out dynamic scale-out SAN storage system that is configured to implement a high-capacity block-level storage system architecture which consolidates the storage devices (e.g., HDDs, SSDs, PCIe or NVMe flash cards, etc.) of the storage nodes 140 into logical storage volumes (e.g., a block unit of storage management) which are identified by, e.g., logical unit numbers (LUNs). In addition, a logical storage volume can be further divided or partitioned into block units that are identified by LUNs. While the host systems 110 can communicate over a front-end network (e.g., LAN/WAN), a SAN utilizes a dedicated network (e.g., a Fibre Channel fabric, an iSCSI fabric, etc.) to provide an any-to-any connection between the host systems 110 and the storage nodes 140.

In particular, in some embodiments, the storage nodes 140 of the data storage system 130 are interconnected in a full-mesh network, wherein back-end interconnectivity between the storage control systems 150 of the storage nodes 140 is achieved using, e.g., a redundant high-speed storage fabric (e.g., 40 Gbps InfiniBand). In some embodiments, the storage nodes 140 utilize remote procedure calls (RPC) for control messages and remote direct memory access (RDMA) for moving data blocks. In some embodiments, the host systems 110, the management server nodes 170, and the server nodes 180 communicate with the storage nodes 140 in a SAN configuration using Ethernet iSCSI and/or Fibre Channel connectivity protocols over the SAN fabric. The SAN fabric comprises SAN networking devices such as SAN switched, routers, protocol bridges, gateway devices, and cables, etc. The SAN network devices move data within the SAN, or between an "initiator" (e.g., an HBA port of an application server) and a "target" (e.g., a port of a storage node 140).

In some embodiments of the SAN configuration, each storage node 140 within the data storage system 130 executes a lightweight operating system and associated software (e.g., software-defined storage software) to implement a software-defined storage (SDS) environment in which the storage nodes 140 collectively communicate and operate to create a server-based SAN system which provides host access to a virtual pool of block storage using the combined storage capacity (e.g., local or network storage devices) of the storage nodes 140. In the SDS environment, the storage control system 150 on each storage node 140 implements various functions that are configured to provision, orchestrate, and manage the local storage resources (e.g., the storage devices 160) of the storage node 140. For example, in the SDS environment, each of the storage nodes 140 run an instance of the storage control system 150 (which operates as a storage data server) to convert the respective local storage resources 160 (e.g., direct-attached storage (DAS) devices and/or NAS storage devices) of the storage nodes 140 into local block storage. Each instance of the storage control system 150 contributes some or all of its local block storage to an aggregated pool of storage of a cluster of the storage nodes 140 to implement a server-based virtual SAN. In this configuration, each storage node 140 is part of a loosely coupled storage server cluster which enables dynamic "scale-out" of the SDS environment, wherein the instances of the storage control system 150 that run on the storage nodes 140 of the cluster contribute their local storage capacity to an aggregated virtual pool of block storage within the virtual SAN.

In a dynamic scale-out storage system, the number of storage nodes 140 can be relatively large (e.g., hundreds of storage nodes 140) wherein the number of storage nodes can dynamically change over time due to, e.g., the addition of new storage nodes into the cluster for increased capacity, the removal of storage nodes from the cluster, the unavailability of storage nodes due to node failures, the swapping in of replacement storage nodes to recover from node failures, etc. In a scale-out storage system, to provide redundancy and resiliency, each host system 110 can have access to each storage volume through multiple independent physical paths. For example, a given host system 110 can connect to a given storage volume over multiple independent paths such that if a primary path to the given storage volume becomes unavailable, the host system 110 can connect to the given storage volume using an alternate or redundant path. The ability for a host system 110 (e.g., application server) to communicate with the same storage volume through multiple physical paths is referred to as "multipathing."

While a host system 110 may implement multipathing to access a single storage volume (e.g., in a storage array) via multiple physical paths, the host system 110 must be properly configured for such multipath access. For example, in some embodiments, a given host system 110 will run multipathing software (e.g., a multipath driver) to enable multipath access to the storage volumes of the storage nodes 140. However, the multipathing software on a given host system 110 needs to be properly configured to enable proper multipath connectivity to the storage volumes, which can be problematic in a dynamic scale-out storage system for many reasons. For example, in instances where a system administrator manually configures the multipathing software on a given host system 110 (e.g., application server) to connect to storage nodes 140 and associated storage volumes, human error can result in misconfigurations which prevent the host system 110 from properly communicating with one or more storage nodes to access one or more storage volumes over one or more paths. For example, for a manual configuration, the system administrator must ensure that the IP addresses for the storage nodes are correct, ensure that the paths to the storage volumes are configured correctly, confirm that primary and redundant paths are actually available and working, etc.

When the scale-out storage environment becomes relatively large, manual configuration becomes increasingly difficult to manage as a given host system 110 can have a significantly large number of possible paths to connect to a given storage volume. Moreover, another problematic issue is that the multipath driver operations must scale with the number of storage volumes or volume images that the multipath driver must manage. For example, the number of objects that the multipath driver must manage is proportional to $\Sigma_{i=1}^{num\ volumes}(\text{vol}(i) \times \text{paths to vol}(i))$. As a result, multipath operations may take longer as the number of storage volumes increases. In addition, the complexity of the multipath operations scale with the number of storage volumes and the number of paths per volume. As explained in further detail below, exemplary embodiments of the disclosure implement host connectivity management techniques to limit a number of paths per storage volume to a number that is sufficient to preserve resiliency and achieve the desired throughput, while decreasing the complexity for multipath management on the host systems.

Moreover, with an increasing number of paths, it becomes increasingly difficult to satisfy the storage system criteria and policies for ensuring resiliency from storage node failures, implementing proper load balancing to handing I/O data access requests to ensure that the storage nodes 140 are not overloaded, etc. Indeed, while a scale-out storage system should support connections from many host systems, the I/O load generated by the application servers toward the storage system should be optimally distributed over the available system ports in a way that utilizes the system resources in a balanced manner, or at least does not overload any storage system component. Furthermore, any change in the storage system, networking, or application server ports can render an existing application server connectivity sub-optimal. The change can be a failure of a node or port, or it can be an addition of a node or port. A change in the application server connectivity to the storage system is required in order to restore resiliency, throughput, and balance.

In view of the above, the host connectivity management system 182 implements methods that are configured to determine, for each host system 110, a subset of ports among the set of all available ports of the storage nodes 140 to which the host system 110 is assigned and can connect to the data storage system 130 and access storage volumes over multiple physical paths based on the assigned subset of ports. The subsets of ports that are dynamically assigned to the host systems 110 are determined in a way which satisfies the requisite connectivity attributes, such as, resiliency, throughput, and balancing the load of the host systems 110 over the storage system resources. The port assignment for a given host system 110 is communicated to the host system 110 using a discovery service based on discovery methods, including, but not limited to, NVMe Over Fabrics Discovery, iSCSI SendTargets, etc.

Figure 2:
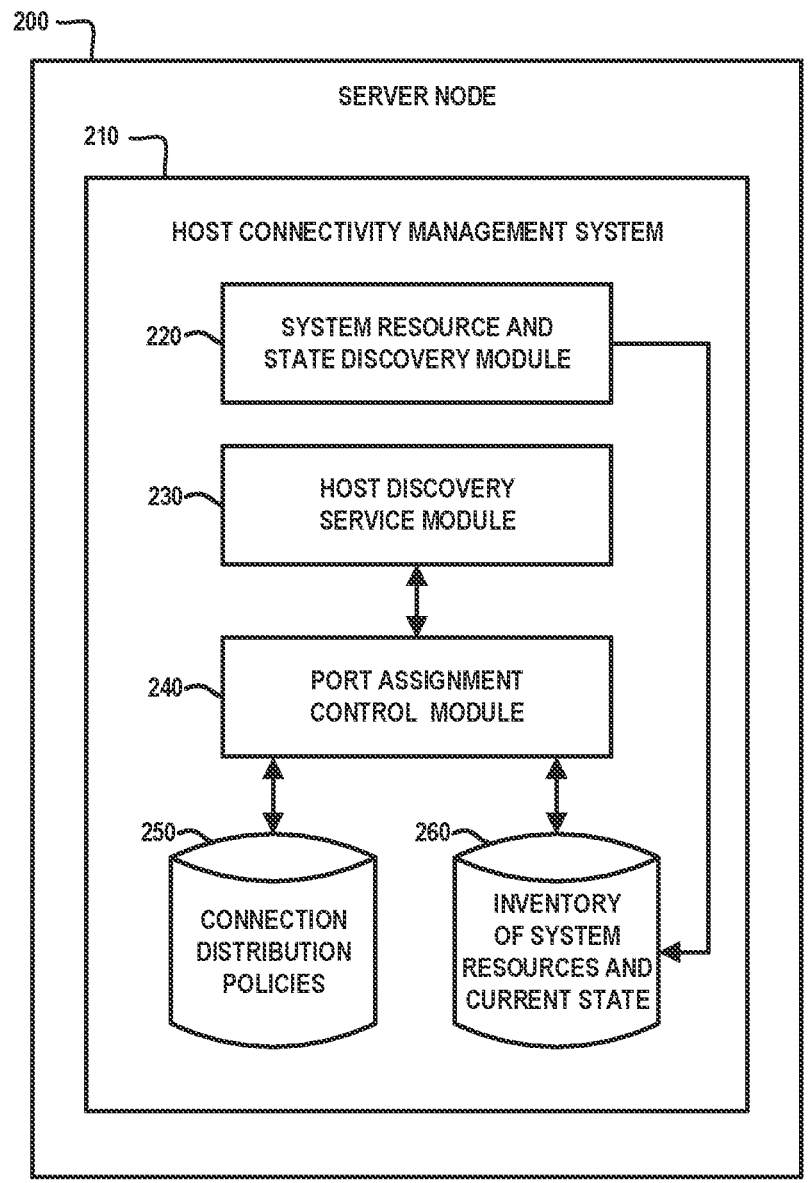
FIG. 2 schematically illustrates a system which is configured to manage host connectivity to a data storage system, according to an exemplary embodiment of the disclosure.

FIG. 2 schematically illustrates a system which is configured to manage host connectivity to a data storage system, according to an exemplary embodiment of the disclosure. More specifically, FIG. 2 schematically illustrates a server node 200 comprising a host connectivity management system 210, which can be implemented in the system 100 of FIG. 1. The host connectivity management system 210 comprises functional modules such as a system resource and state discovery module 220, a host discovery service module 230, and a port assignment control module 240. In addition, the host connectivity management system 210 maintains and utilizes a datastore of connection distribution policies 250 and a datastore which comprises information regarding a current inventory of storage system resources and a current state of such resources 260.

As noted above, in some embodiments, the host connectivity management system 210 comprises a centralized system which executes on the server node 200 (or a plurality of server nodes) apart from the management server nodes 170 and the storage nodes 140 of the data storage system 130. In some embodiments, the host connectivity management system 210 executes on the management server nodes 170. In some embodiments, the host connectivity management system 210 executes on one or more storage nodes 140 of the data storage system 130. In some embodiments, the host connectivity management system 210 is configured to operate in a distributed manner across a plurality of nodes (e.g., server nodes and/or storage nodes) in the data storage system 130. For example, in a storage system where the storage nodes 140 are divided into failure domains, each failure domain can have a dedicated host connectivity management system which is responsible for port assignments to host systems that are connected to storage nodes within the failure domain.

The system resource and state discovery module 220 implements methods that are configured to automatically discover constituent logical and physical elements of the storage environment and a current configuration of such discovered elements. For example, depending on the type of storage environment and associated architecture, the system resource and state discovery module 220 is configured to automatically discover elements such as, e.g., initiator endpoints (e.g., host systems such as application servers, etc.), target endpoints (e.g., storage nodes, storage controller nodes, namespaces, volumes, etc.), elements of a storage fabric (e.g., fabric infrastructure such as switches, ports, etc.), and a current configuration of such elements. For example, for initiator endpoints (e.g., host systems) and target endpoints (e.g., storage node), the configuration information can include an endpoint identifier and type (e.g., application server, storage node), the transport protocol information (e.g., protocol type, address, etc.), fabric port (e.g., Ethernet interface), a fabric address (e.g., IP address, logical port, etc.). For storage fabric elements, the configuration information can include information such as fabric type (port-based fabric, addressable fabric, etc.) and other relevant configuration information with regard to, e.g., components of the storage fabric (e.g., fabric infrastructure such as switches, ports, etc.).

The system resource and state discovery module 220 maintains and continually updates an inventory of the automatically discovered system resources in the datastore 260. Furthermore, the system resource and state discovery module 220 monitors the operating state of the system resources on a continuous or periodic basis to determine information, such as, the current operational states of the storage nodes 140 (active, inactive, failed, etc.), the I/O load on the storage nodes 140, the type of I/O load on the storage nodes 140 (e.g., read intensive loads, or write intensive loads), the number of host system connections to each of the ports of the storage nodes 140, etc. The system resource and state discovery module 220 maintains and updates information in the datastore 260 regarding the current operating state of the system resources. In some embodiments, the system resource and state discovery module 220 communicates with the storge nodes 140 and other system and network resources on a periodic or continuous basis to determine a current inventory of available resources, the operating state of the resources, host connectivity with the storage nodes, and I/O loads of the host systems that are connected to the data storage system.

The host connectivity management system 210 utilizes the system inventory and state information 260 to determine and assign a subset of ports to new host systems requesting initial connectivity to storage nodes of the data storage system, and to determine and reassign updated subsets of ports to existing host systems that are already connected to storage nodes of the data storage system in response to changes in the current state of the storage system which occur over time. In some embodiments, the host connectivity management system 210 informs the storage nodes 140 of anticipated host connectivity based on the recommended port assignments to the host systems. In some embodiments, the storage nodes 140 utilize this information to handle host connection requests.

The host discovery service module 230 implements methods that are configured to implement a discovery mechanism that is utilized by a host system 110 to request access to the data storage system and to obtain connectivity information which allows the host system to connect to the data storage system. In some embodiments, the host connectivity management system 210 is configured as a target endpoint which is assigned to a specific IP address and port which allows the host systems to connect to the centralized host connectivity management system 210. The host discovery service module 230 communicates with the port assignment control module 240 to obtain connection information (e.g., subset of ports assigned to the host system), and the host discovery service module 230 transmits the port assignment list and other relevant information to the host system, which allows the host system to connect to storage nodes within the data storage system.

The host discovery system 230 can be implemented using dynamic discovery services including, but not limited to, NVMe-oF Discovery protocol, iSCSI SendTargets, Fiber Channel Target Driven Zoning, etc., depending on the given storage system environments. In other embodiments, control path methods can be implemented to allow the host system to communicate with the host connectivity management system 210 and obtain the port assignment and connection information through a control interface such as command-line interface (CLI). In such embodiments, the connection information is transferred to the host systems through some mechanism such as manually or through an orchestration infrastructure.

In some embodiments, host connection to the host discovery service module 230 is a temporary connection whereby the host system disconnects from the host connectivity management system 210 after obtaining the initial connectivity information. In other embodiments, the host system maintains a persistent connection with the host connectivity management system 210 after receiving the initial connectivity information, and while the host system is connected to the data storage system. The persistent connection allows the host discovery service module 230 to push notifications to the host system when there are changes in the system resources and/or state (e.g., storage node(s) added/removed/failed, changes in fabric configuration, etc.). In response to receiving such notifications, the host system can issue new discovery requests to obtain updated connection information (e.g., updated port assignments) as desired. Moreover, in some embodiments, the persistent connection allows the host connectivity management system 210 to push updated connection information to a given host system in circumstances where changes in the system resources and/or state would necessitate the host system reconfiguring its connection to storage nodes of the data storage system to optimize, e.g., the load balancing of the storage node resources.

The port assignment control module 240 implements methods that are configured to determine a recommended connection (e.g., a subset of ports) for a given host system based on various criteria including, but not limited to, a current state of the system resources, current or updated inventory of system resources (as maintained in the datastore 260) and one or more connection distribution policies 250. The information regarding a current state of the system resources includes, but is not limited to, the storage system components and their current state, the load experienced by the system components (current load or historically), the system component resources, e.g. CPU, and whether they are evenly distributed across all the system components or not, the existing set of host systems that are connected to the data storage system, the port connectivity of such host systems, the I/O load (currently or historically) associated with data access requests from the host systems, etc. A change in the inventory of the system resources (a new condition) includes, for example, the addition or removal of a host system, the addition or removal/failure of a storage system node, component, or resource.

The connection distribution policies 250 specify criteria for distributing the host system connections to the available ports of the storage nodes. For example, a connection distribution policy may specify that there be an equal distribution of host system connections over the components of the storage system. For example, the connection distribution policy can specify a port assignment which provides an equal distribution of host system connections over the storage nodes and the ports of the storage nodes. Another connection distribution policy may specify that the host system connections are distributed in proportion to some system resource, e.g. CPU, memory, network, etc. Another connection distribution policy may specify a distribution which achieves an equal distribution of an average I/O load of the host systems over the storage system components (e.g., the storage nodes). Another connection distribution policy may specify that a distribution which achieves a distribution of the average I/O load of the host systems in proportion to some system resource, e.g., processor resources (e.g., CPUs), memory resources, network resources, etc.

In another embodiment, a connection distribution policy may specify distributing a storage volume access over the available connections. With this policy, a total number of the host connections to the storage array is higher than the multipath driver recommendation but not much higher, and each storage volume is exposed to the host system on a subset of the host connections. By way of example, a given host may be assigned sixteen (16) ports for connection to the data storage system, but each storage volume is exposed to the host system by no more than eight (8) ports. If one connection to a storage volume is lost, then the system can expose the storage volume from another connection to provide resiliency without having the host system to connect to a new port. In this regard, it is easier for the storage system to expose the storage volume to the host system through another port, as opposed to the storage system having to communicate with the host system to direct the host system to connect to another port. In this regard, the benefits of such connectivity distribution are, e.g., (i) smaller granularity of the distribution allows a more equal distribution of load and (ii) the existence of additional host connections allows faster recovery of connections-per-volume resiliency in case of failure, since the storage can expose the volume through an existing host connection.

The port assignment control module 240 utilizes the above information to determine a subset of ports (among all the available ports of the data storage nodes in the data storage system) to assign to the host system and allow the host system to connect to the data storage system using some or all of the assigned ports. The port assignment control module 240 provides the recommended connectivity for a given host system to the host discovery service module 230, and the host discovery service module 230 transmits the recommended connection information to the host system. The recommended connectivity (e.g., number of ports) may be different between different host systems depending on the specific requirements of the host systems (e.g., I/O throughput), and a new recommended connectivity may be provided to a given host system in response to a change in the requirements of the host system.

With this scheme, a host system does not need knowledge on how to connect, or otherwise need to determine how to connect, to the data storage system. Instead, the recommended connection information that is returned to the host system from the host connectivity management system 210 specifies how the host system should connect to the data storage system. This is in contrast to conventional schemes in which the host system (e.g., application server), through a discovery request, is provided a list of all available ports and paths to all storage volumes in a data storage system, where the host system is required to determine which ports and paths to use for connection to the data storage system and storage volumes of the storage nodes. The exemplary embodiments of the disclosure as described herein limit the returned paths to a set that the host system should use, thereby removing the dependency on the host system having to handle the returned path list.

The host connectivity management system 210 allows a reduction in the planning effort required to achieve a resilient, performant, and well-balanced host system connectivity. This is a particularly significant effort in large scale-out environments where the number of possible combinations is very large. In addition, host connectivity management system 210 allows a reduction in the planning and configuration effort associated with changes in the storage system and application server. This is particularly important in a dynamic environment, such as a software-defined-storage environment, where changes are relatively frequent.

The host connectivity management system 210 can determine a recommended connectivity for new host systems requesting initial access and connection to the data storage system, as well as determine an updated recommended connectivity for host systems that are already connected to and utilizing the data storage system. As noted above, a host system can request an updated recommended connectivity in response to a notification received from the host connectivity management system 210 regarding a change in the inventory or state of the storage system. The calculation can be carried out in response to the host system demand, when a new host system connects to the data storage system, or when a host system requests an updated connectivity recommendation. Alternatively, the calculation can be carried out by the storage system in response to change and pushed to the application servers.

Figure 3A:
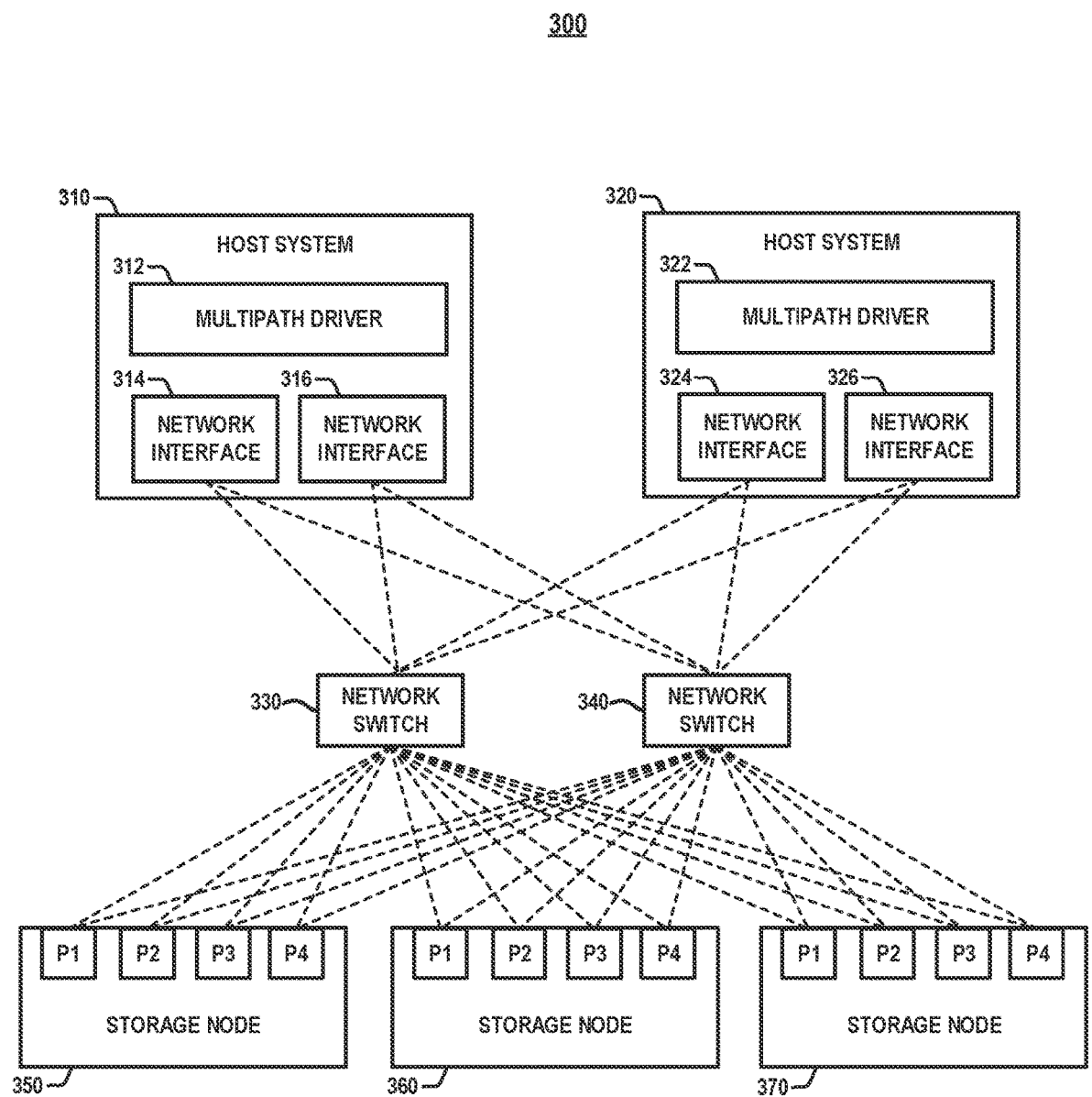
Figure 3C:
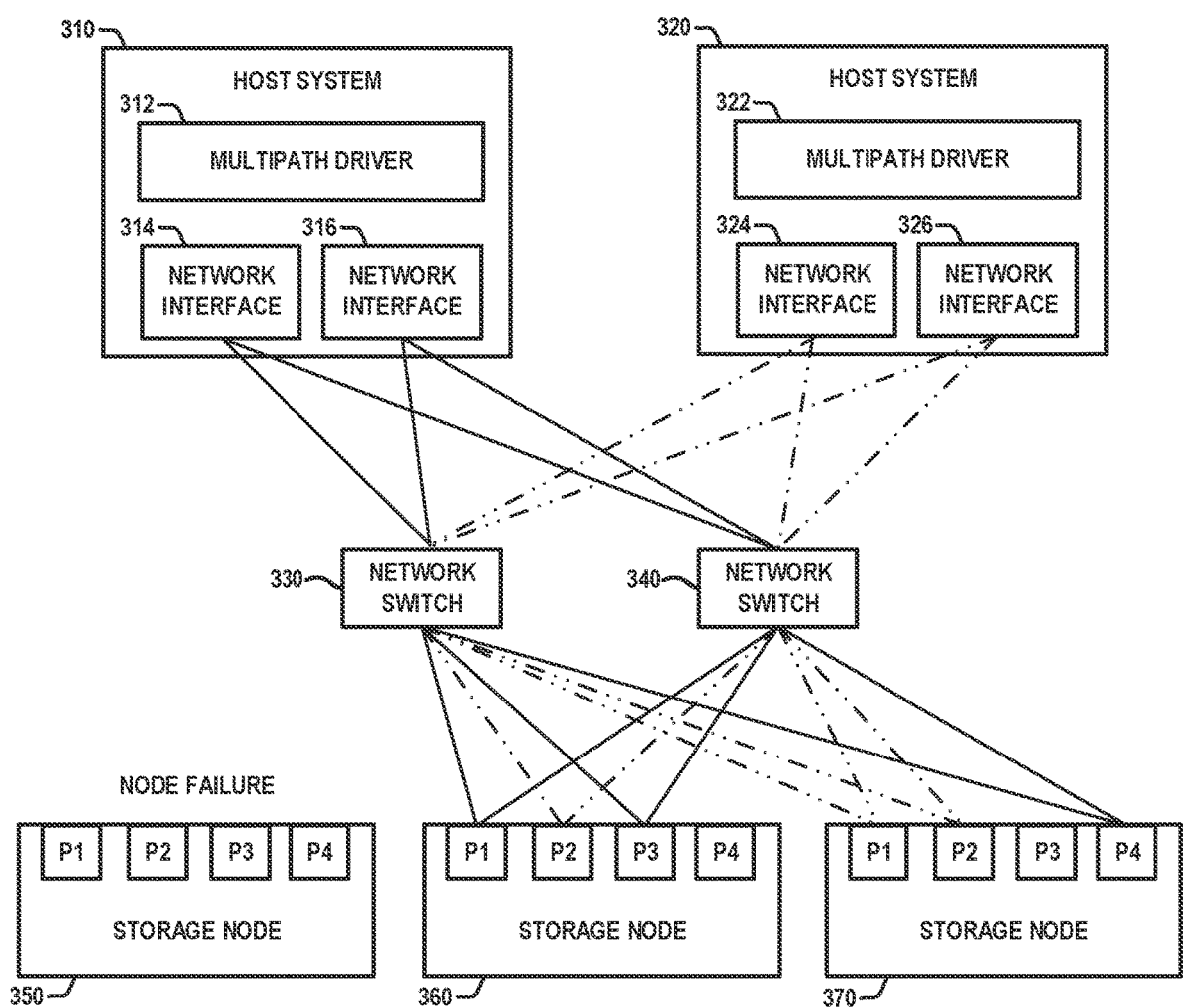

FIGS. 3A, 3B, and 3C schematically illustrate methods for managing host connectivity to a data storage system, according to an exemplary embodiment of the disclosure. FIG. 3A schematically illustrates a computing environment 300 comprising host systems 310 and 320, network switches 330 and 340, and a data storage system comprising three storage nodes 350, 360, and 370. The host system 310 comprises a multipath driver 312 and network interfaces 314 and 316 (providing two ports). Similarly, the host system 320 comprises a multipath driver 322 and network interfaces 324 and 326 (providing two ports). Each storage node 350, 360, and 370 comprises a plurality of ports P1, P2, P3, and P4. For purposes of illustration, the storage nodes 350, 360, and 370 have four ports, although each storage node 350, 360, and 370 may have any number of ports, e.g., 2 ports, 8 ports, 16 ports, etc. In some embodiments, each port is associated with at least one storage controller of the storage node. In other embodiments, each storage controller of the storage node is associated with groups of ports.

The multipath drivers 312 and 322 control multipath access of the host systems 310 and 320 to the storage nodes 350, 360, and 370 using known methods. For example, the multipath drivers 312 and 322 automatically identify redundant I/O paths, and automatically reroute I/O to an alternate path when, e.g., a storage controller or storage node fails or all data paths to a given storage node or storage controller fail. In addition, the multipath drivers 312 and 322 check the status of known paths to the storage volume, and provide load balancing of I/O requests between the available paths. In accordance with exemplary embodiments of the disclosure, the multipath drivers 312 and 322 manage the connections to the storage nodes 350, 360, and 370 along known paths that connect to a subset of ports assigned to the respective host systems 310 and 320 by a host connectivity management system.

The network interfaces 314, 316, 324, and 326 can be implemented using various types of adaptors that are commonly used in computer or storage networks to connect a host system to storage and/or network devices, depending on the storage environment. For example, network interfaces 314, 316, 324, and 326 may comprise host bus adapters (HBAs), network interface cards (NICs), converged network adaptors (CNAs), etc. An HBA enables I/O processing and provides physical connection between the host system and storage or network devices (e.g., network switches 330 and 340) in a SAN environment. The HBA can be utilized for Fibre Channel (FC), and iSCSI (Internet Small Computer System Interface) protocol enabled connections. An NIC can be used for an Ethernet-based network environment. A CNA converges the functions of an HBA with NIC in a single adaptor.

FIG. 3A schematically illustrates a fabric connect configuration, wherein each host system 310 and 320 can have at least two connections to each network switch 330 and 340, and wherein each network switch 330 and 340 can connect to each port P1, P2, P3 and P4 of each storage node 350, 360, and 370. In this configuration, there exists multiple physical paths through which each host system 310 and 320 can connect to each storage node 350, 360, and 370, where all available paths are depicted in FIG. 3A as dashed lines. In a conventional scheme, the multipath drivers 312 and 322 are configured to utilize all of such available paths. However, as noted above, as the storage system is scaled up and the number of storage nodes increases, connectivity issues can arise with regard to path management by the multipath drivers 312 and 322 as such multipath drivers typically do not scale well as the number of available paths to the storage volumes increases.

FIG. 3B schematically illustrates a connection configuration within the computing environment 300 wherein the host systems 310 and 320 have a limited number of available paths for connectivity to the storage nodes 350, 360, and 370 due to an assignment of a subset of ports for connectivity. In the exemplary embodiment of FIG. 3B, it is assumed that that host connectivity is based, at least in part, on a connection distribution policy in which the host connections are equally distributed over the storage nodes and associated ports. To provide resiliency to port or node failure, each host system connects to the data storage system through 3 ports located on 3 separate storage nodes.

In particular, the available paths between the host system 310 and the storage nodes 350, 360, and 370 are illustrated by solid lines, and the available paths between the host system 320 and the storage nodes 350, 360, and 370 are illustrated by dashed lines. In the exemplary configuration of FIG. 3B, it is assumed that the host connectivity management system 210 has assigned the host system 310 the use of 3 ports among the total number of 12 ports of all the storage nodes 350, 360, and 370, for connectivity to the data storage system. In particular, the host 310 is assigned use of the first port P1 of the storage node 350, the third port P3 of the storage node 360, and the fourth port P4 of the storage node 370. Similarly, in the exemplary configuration of FIG. 3B, it is assumed that the host connectivity management system 210 has assigned the host system 320 the use of 3 ports among the total number of 12 ports of all the storage nodes 350, 360, and 370, for connectivity to the data storage system. In particular, the host 320 is assigned use of the third port P3 of the storage node 350, the second port P2 of the storage node 360, and the first port P1 of the storage node 370.

FIG. 3C schematically illustrates an updated connection configuration within the computing environment 300 which occurs due to a failure of the storage node 350, and the host connectivity management system 210 determining an updated recommended connectivity for each of the existing and currently connected host systems 310 and 320. More specifically, in the exemplary embodiment of FIG. 3C, it is assumed that (i) the port assignment for the host 310 is updated to assign use of the first port P1 of the storage node 360 (in place of the first port P1 on the failed storage node 350), and (ii) the port assignment for the host 320 is updated to assign use of the second port P2 of the storage node 370 (in place of the third port P3 on the failed storage node 350). The reassignment of the ports is determined in a manner that restores the resiliency of the connectivity of the host systems 310 and 320 to the data storage system while maintaining balance of the port connectivity among the storage nodes 350, 360, and 370.

FIG. 4 is a flow diagram of a method for managing host connectivity to a data storage system, according to an exemplary embodiment of the disclosure. In particular, FIG. 4 illustrates an exemplary mode of operation of a host connectivity management system (e.g., system 182, FIG. 1 or system 210, FIG. 2). The host connectivity management system receives a request from a host system to connect to a data storage system (block 400). The data storage system comprises storage nodes which comprise storage volumes, wherein each storage node comprises multiple ports to enable connection to the storage node. The host connectivity management system determines a subset of ports, among all available ports of the storage nodes, to assign to the host system for use by the host system for connecting to the storage nodes of the data storage system to access the storage volumes (block 401). The host connectivity management system sends connection information to the host system to enable the host system to connect to the data storage system, wherein the connection information comprises port identifiers associated with the subset of ports assigned to the host system (block 402).

Figure 5:
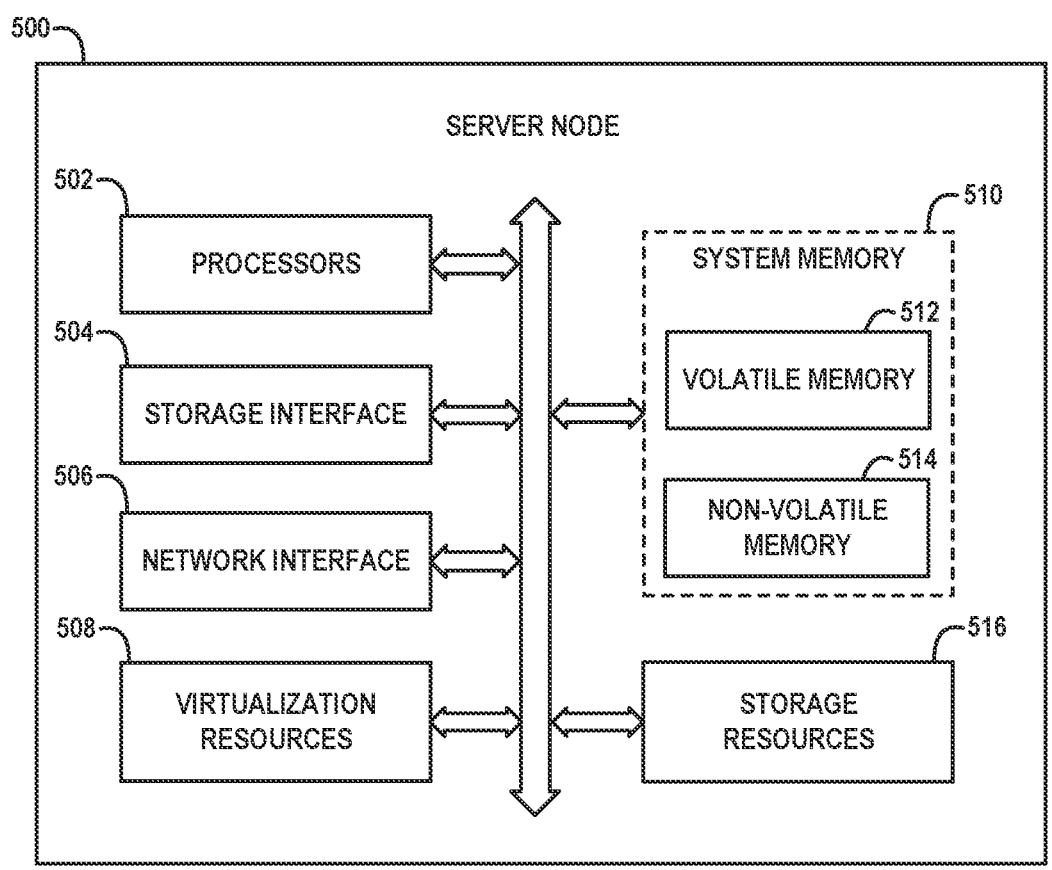
FIG. 5 schematically illustrates a framework of a server node which can host a system for managing host connectivity to a data storage system, according to an exemplary embodiment of the disclosure.

FIG. 5 schematically illustrates a framework of a server node which can host a system for managing host connectivity to a data storage system, according to an exemplary embodiment of the disclosure. In some embodiments, FIG. 5 illustrates an exemplary embodiment of server node (e.g., server node 180 (FIG. 1) or server node 200 (FIG. 2)) which runs a host connectivity management system (e.g., system 182 (FIG. 1) or system 210 (FIG. 2)). The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the server node 500. For example, the virtualization resources 508 can be configured to implement the various modules and functionalities of a host connectivity management system as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components (e.g., modules 220, 230, 240) of the host connectivity management system 210 (FIG. 2) comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
implementing, by a host connectivity management system, a discovery service configured to receive at least one discovery request issued by a host system that connects to the discovery service, the host system obtaining in response to the discovery request information to be utilized by the host system to connect to a data storage system, wherein the data storage system comprises a scale-out data storage system comprising a plurality of storage nodes, wherein each storage node comprises at least portions of one or more storage volumes, and wherein each storage node comprises multiple ports to enable connection to the storage node;
establishing, by the host connectivity management system, a network connection with the host system and receiving the discovery request from the host system requesting information to be utilized by the host system to connect to the data storage system;
automatically determining, by the host connectivity management system, a subset of ports, among all available ports of the storage nodes, to assign to the host system for use by the host system for connecting to one or more of the storage nodes of the data storage system to access one or more of the storage volumes;
sending, by the host connectivity management system, a response to the discovery request to the host system, wherein the response comprises connection information to enable the host system to connect to one or more storage nodes of the data storage system, wherein the connection information comprises port identifiers associated with the subset of ports assigned to the host system;
maintaining, by the host connectivity management system, the network connection with the host system as a persistent network connection while the host system is connected to the data storage system; and
utilizing, by the host connectivity management system, the persistent network connection to push updated port assignment information to the host system, wherein the updated port assignment information comprises an updated subset of ports for use by the host system for reconfiguring connections to one or more storage nodes of the data storage system.

2. The method of claim 1, wherein automatically determining the subset of ports comprises utilizing, by the host connectivity management system, information regarding an inventory of storage resources of the data storage system and an operational state of the storage resources, and at least one connection distribution policy which specifies a criterion for distributing host system connectivity among the available ports of the storage nodes, to determine the subset of ports to assign to the host system.

3. The method of claim 2, wherein the information comprising the operational state of the storage resources comprises at least one of an input/output (I/O) load of the storage nodes and a current connectivity of other host systems to ports of the storage nodes.

4. The method of claim 2, wherein the at least one connection distribution policy specifies a port assignment which provides an equal distribution of host system connections over the storage nodes and the ports of the storage nodes.

5. The method of claim 2, wherein the at least one connection distribution policy specifies a port assignment which provides host system connections to be distributed in proportion to a system resource including at least one of a processor resource, a memory resource, and a network resource.

6. The method of claim 2, wherein the at least one connection distribution policy specifies a port assignment which provides an equal distribution of an average I/O load of the host systems over the storage nodes.

7. The method of claim 2, wherein the at least one connection distribution policy specifies a port assignment which provides an equal distribution of an average I/O load of the host systems in proportion to a system resource including at least one of a processor resource, a memory resource, and a network resource.

8. The method of claim 1, further comprising utilizing, by the host connectivity management system, the persistent network connection to push a notification to the host system of at least one of a change in an inventory of storage resources of the data storage system and a change in an operational state of the storage resources of the data storage system.

9. The method of claim 1, wherein the updated port assignment is automatically determined by the host connectivity management system in response to at least one of (i) a change in an inventory of storage resources of the data storage system, (ii) a change in an operational state of the storage resources of the data storage system, (iii) a change in a number of host systems connected to the data storage system, and (iv) a change in input/output (I/O) load generated by one of the host system and at least one other host system connected to the data storage system.

10. An article of manufacture comprising a non-transitory processor-readable storage medium having stored therein program code of one or more software programs, wherein the program code is executable by one or more processors to implement a method which comprises:
implementing, by a host connectivity management system, a discovery service configured to receive at least one discovery request issued by a host system that connects to the discovery service, the host system obtaining in response to the discovery request information to be utilized by the host system to connect to a data storage system, wherein the data storage system comprises a scale-out data storage system comprising a plurality of storage nodes, wherein each storage node comprises at least portions of one or more storage volumes, and wherein each storage node comprises multiple ports to enable connection to the storage node;

establishing, by the host connectivity management system, a network connection with the host system and receiving the discovery request from the host system requesting information to be utilized by the host system to connect to the data storage system;

automatically determining, by the host connectivity management system, a subset of ports, among all available ports of the storage nodes, to assign to the host system for use by the host system for connecting to one or more of the storage nodes of the data storage system to access one or more of the storage volumes;

sending, by the host connectivity management system, a response to the discovery request to the host system, wherein the response comprises connection information to enable the host system to connect to one or more storage nodes of the data storage system, wherein the connection information comprises port identifiers associated with the subset of ports assigned to the host system;

maintaining, by the host connectivity management system, the network connection with the host system as a persistent network connection while the host system is connected to the data storage system; and utilizing, by the host connectivity management system, the persistent network connection to push updated port assignment information to the host system, wherein the updated port assignment information comprises an updated subset of ports for use by the host system for reconfiguring connections to one or more storage nodes of the data storage system.

11. The article of manufacture of claim 10, wherein automatically determining the subset of ports comprises utilizing, by the host connectivity management system, information regarding an inventory of storage resources of the data storage system and an operational state of the storage resources, and at least one connection distribution policy which specifies a criterion for distributing host system connectivity among the available ports of the storage nodes, to determine the subset of ports to assign to the host system.

12. The article of manufacture of claim 11, wherein the information comprising the operational state of the storage resources comprises at least one of an input/output (I/O) load of the storage nodes and a current connectivity of other host systems to ports of the storage nodes.

13. The article of manufacture of claim 11, wherein the at least one connection distribution policy specifies at least one of (i) a port assignment which provides an equal distribution of host system connections over the storage nodes and the ports of the storage nodes, (ii) a port assignment which provides host system connections to be distributed in proportion to a system resource including at least one of a processor resource, a memory resource, and a network resource, (iii) a port assignment which provides an equal distribution of an average I/O load of the host systems over the storage nodes, and (iv) a port assignment which provides an equal distribution of an average I/O load of the host systems in proportion to a system resource including at least one of a processor resource, a memory resource, and a network resource.

14. The article of manufacture of claim 10, further comprising program code that is executable by the one or more processors to implement a method which comprises utilizing, by the host connectivity management system, the persistent network connection to push a notification to the host system of at least one of a change in an inventory of storage resources of the data storage system and a change in an operational state of the storage resources of the data storage system.

15. The article of manufacture of claim 10, wherein the updated port assignment is automatically determined by the host connectivity management system in response to at least one of (i) a change in an inventory of storage resources of the data storage system, (ii) a change in an operational state of the storage resources of the data storage system, (iii) a change in a number of host systems connected to the data storage system, and (iv) a change in input/output (I/O) load generated by one of the host system and at least one other host system connected to the data storage system.

16. A system, comprising:
a data storage system which comprises a scale-out data storage system comprising a plurality of storage nodes, wherein each storage node comprises at least portions of one or more storage volumes, wherein each storage node comprises multiple ports to enable connection to the storage node; and a management server node comprising at least one processor, and a system memory configured to store program code, wherein the program code is executable by the at least one processor to implement a host connectivity management system which is configured to:
implement a discovery service configured to receive at least one discovery request issued by a host system that connects to the discovery service, the host system obtaining in response to the discovery request information to be utilized by the host system to connect to the data storage system;

establish a network connection with the host system and receive the discovery request from the host system requesting information to be utilized by the host system to connect to the data storage system;

automatically determine a subset of ports, among all available ports of the storage nodes, to assign to the host system for use by the host system for connecting to one or more of the storage nodes of the data storage system to access one or more of the storage volumes;

send a response to the discovery request to the host system, wherein the response comprises connection information to enable the host system to connect to one or more storage nodes of the data storage system, wherein the connection information comprises port identifiers associated with the subset of ports assigned to the host system;

maintain the network connection with the host system as a persistent network connection while the host system is connected to the data storage system; and utilize the persistent network connection to push updated port assignment information to the host system, wherein the updated port assignment information comprises an updated subset of ports for use by the host system for reconfiguring connections to one or more storage nodes of the data storage system.

17. The system of claim 16, wherein in automatically determining the subset of ports, the host connectivity management system is configured to utilize information regarding an inventory of storage resources of the data storage system and an operational state of the storage resources, and at least one connection distribution policy which specifies a criterion for distributing host system connectivity among the available ports of the storage nodes, to determine the subset of ports to assign to the host system.

18. The system of claim 17, wherein:
the information comprising the operational state of the storage resources comprises at least one of an input/output (I/O) load of the storage nodes and a current connectivity of other host systems to ports of the storage nodes; and
the at least one connection distribution policy specifies at least one of (i) a port assignment which provides an equal distribution of host system connections over the storage nodes and the ports of the storage nodes, (ii) a port assignment which provides host system connections to be distributed in proportion to a system resource including at least one of a processor resource, a memory resource, and a network resource, (iii) a port assignment which provides an equal distribution of an average I/O load of the host systems over the storage nodes, and (iv) a port assignment which provides an equal distribution of an average I/O load of the host systems in proportion to a system resource including at least one of a processor resource, a memory resource, and a network resource.

19. The system of claim 16, wherein the host connectivity management system is configured to utilize the persistent network connection to push a notification to the host system of at least one of a change in an inventory of storage resources of the data storage system and a change in an operational state of the storage resources of the data storage system.

20. The system of claim 16, wherein the updated port assignment is automatically determined by the host connectivity management system in response to at least one of (i) a change in an inventory of storage resources of the data storage system, (ii) a change in an operational state of the storage resources of the data storage system, (iii) a change in a number of host systems connected to the data storage system, and (iv) a change in input/output (I/O) load generated by one of the host system and at least one other host system connected to the data storage system.

* * * * *